(12) United States Patent
Nelson et al.

(10) Patent No.: US 7,755,536 B1
(45) Date of Patent: Jul. 13, 2010

(54) METHOD OF SIGNAL PROCESSING FOR DETERMINING RANGE AND VELOCITY OF AN OBJECT

(75) Inventors: Douglas J. Nelson, Columbia, MD (US); David C. Smith, Columbia, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 828 days.

(21) Appl. No.: 11/703,042

(22) Filed: Feb. 6, 2007

(51) Int. Cl.
*G01S 13/42* (2006.01)

(52) U.S. Cl. ............... 342/109; 342/111; 342/192; 342/196

(58) Field of Classification Search ......... 342/107–112, 342/115–116, 189, 192, 195–196
See application file for complete search history.

(56) References Cited

U.S. PATENT DOCUMENTS

| | | | |
|---|---|---|---|
| 3,720,950 A * | 3/1973 | Vehrs, Jr. ................. | 342/162 |
| 4,916,452 A * | 4/1990 | Borchert et al. .......... | 342/109 |
| 6,097,669 A * | 8/2000 | Jordan et al. ............. | 367/99 |
| 6,232,913 B1 * | 5/2001 | Lehtinen ................... | 342/137 |
| 6,480,142 B1 * | 11/2002 | Rubin ....................... | 342/26 R |
| 6,636,174 B2 | 10/2003 | Arikan et al. | |
| 7,714,771 B2 * | 5/2010 | Lehre et al. .............. | 342/109 |

OTHER PUBLICATIONS

U.S. Appl. No. 10/996,462, filed Jul. 14, 2005, Zaugg.
U.S. Appl. No. 11/180,811, filed Apr. 20, 2006, Arikan et al.

\* cited by examiner

*Primary Examiner*—John B Sotomayor
(74) *Attorney, Agent, or Firm*—Jennifer P. Ferragut; Robeert D. Morelli

(57) ABSTRACT

The present invention is a method of finding range and velocity of a target in a radar system using a time scale factor. Specifically, sending at least one signal from at least one transmitter to a target. A return signal is then received from the target at each transmitter and the elapsed time is recorded. The range to the target and velocity of the target are calculated based on a time scale factor of the recorded elapsed times. These values are appropriately output to the user.

11 Claims, 1 Drawing Sheet

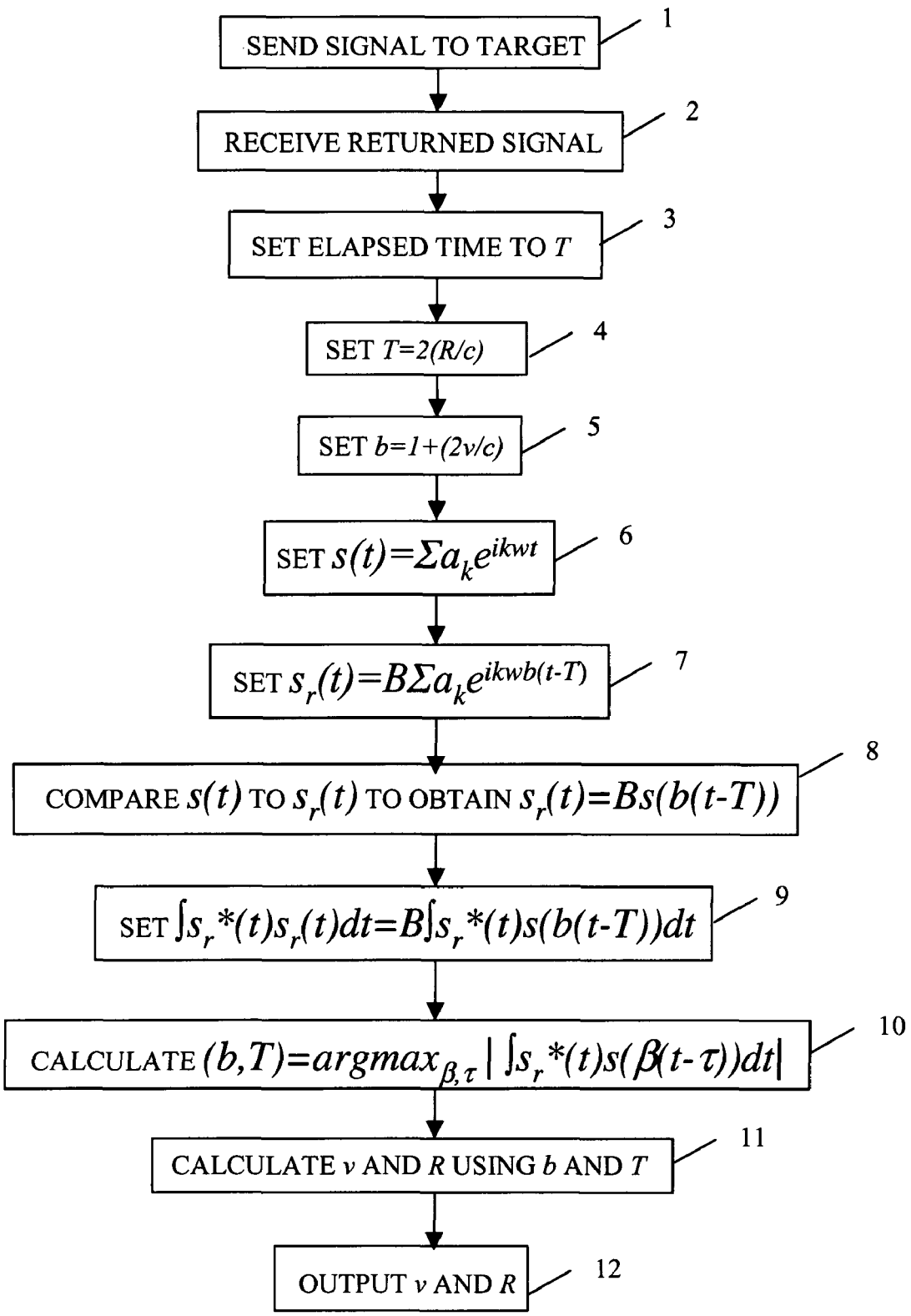

METHOD OF SIGNAL PROCESSING FOR DETERMINING RANGE AND VELOCITY OF AN OBJECT

FIELD OF THE INVENTION

The present invention relates to a method of determining velocity in directive radar devices and, more specifically, to a method of determining velocity combined with determining distance in directive radar devices.

BACKGROUND OF THE INVENTION

Doppler is a familiar phenomenon in which the frequency of a received signal appears to change as the radial velocity between the transmitter and receiver changes. Historically, this change in frequency has been modeled as a translation in frequency, but, as we will show, this model is not correct. The correct model is that Doppler results in a change of scale of the time axis of the signal.

Perhaps the first application of the Doppler equation was the measurement of the velocity at which stars are moving away from us. Under the big bang theory, this information can be used to estimate the distance of stars in the universe. In estimating the velocity of stars, light from an individual star was isolated and passed through a prism. The emission spectrum of an element, such as hydrogen, was identified and the apparent shift of one spectral emission component was measured to determine the star's velocity. In this case, the Doppler shift is easily measured since emission spectra consist of the sum of isolated sine waves at precise known frequencies.

With the invention of radar, it became necessary to resolve position and velocity. For radars operating with a fixed stable carrier frequency or a fixed stable pulse repetition frequency (PRF), the problem is similar to the star velocity problem. One may estimate the observed frequency of the carrier or PRF and obtain an estimate of the target velocity. This problem is again equivalent to estimation of the shift in frequency of a single sine wave. For the pulsed signal, the range may be estimated by calculating the delay between the time a pulse was transmitted and the time it was received. Range and velocity may therefore be simultaneously estimated from delay and Doppler. This is perhaps the first example of a Cross Ambiguity Function (CAF) process in which time delay and Doppler frequency are jointly estimated from the transmitted and received signals. For the radar problem, Doppler is universally modeled as a translation in frequency. The conventional CAF process provides acceptable results if the transmitted signal is a single sine wave, as it generally is with narrow band signals, however if the signal is not a sine wave the results obtained will not be accurate. To date, no methods have been developed to accurately measure non-sinusoidal signals.

U.S. Pat. No. 6,636,174, entitled "SYSTEM AND METHOD FOR DETECTION AND TRACKING OF TARGETS," discloses a method of using a fractional Fourier transform in a CAF to track objects. This method is useful, for example, in radar and sonar systems to find position and estimate the velocity of signals. By altering computations in this method, the signals can be mapped to polar coordinates, as opposed to Cartesian, which is more accurate for certain types of signals. However, it does not address the problems solved by the present invention. U.S. Pat. No. 6,636,174 is hereby incorporated by reference into the present invention.

U.S. patent application Ser. No. 10/996,462, entitled "QUANTUM CROSS-AMBIGUITY FUNCTION GENERATOR," discloses a method of applying quantum mechanics to the traditional cross-ambiguity function to achieve more accurate computations at increased bandwidths for both geo-location and radar applications. The constructed cross-ambiguity function generator, rather than having either an analog or digital construction, has a construction based on the properties of quantum physics based on electro-optical elements. Because the invention is based on different technology than existing systems, the advantages obtained by this invention will require significant investment by current users to implement. Further, it does not solve the problem addressed by the present invention. U.S. patent application Ser. No. 10/996,462 is hereby incorporated by reference into the specification of the present invention.

U.S. patent application Ser. No. 11/180,811, entitled "METHODS FOR DETECTION AND TRACKING OF TARGETS," discloses a method of detecting and tracking targets. Specifically, signals are received and reflected from targets and processed to compute slices of the CAF. These slices are used to find the signal delay and Doppler shift associated with the targets, which facilitates tracking and targeting. This method attempts to solve the problem by only calculating slices of the CAF, thus simplifying computation. This does not result in the improvement in accuracy achieved by the present invention. U.S. patent application Ser. No. 11/180,811 is hereby incorporated by reference into the present invention.

Although prior art methods have been developed for locating and tracking targets, specifically in radar applications, these methods are primarily accurate only in narrowband applications. Methods that have attempted to account for problems beyond the narrow bandwidth case require extensive modifications to existing radar equipment, and therefore are impractical for users or manufacturers to implement from both a cost and efficiency standpoint. What is required in the art is a method of processing signals to determine position and velocity of a target accurately over a wide range of bandwidths.

SUMMARY OF THE INVENTION

It is an object of the present invention to provide a method of determining the position and velocity of targets over a wide range if bandwidths.

It is a further object of the present invention to provide a method of determining the position and velocity of targets over a wide range if bandwidths, wherein the position and velocity are determined using a scalar relationship dependant on the radial velocity of the transmitter with respect to the receiver.

The present invention is a method of signal processing for geolocation of objects. The first step of the method is sending a signal from a transmitter to a target.

The second step of the method is receiving a return signal from the target at the transmitter.

The third step of the method is setting R=cT/2, wherein R is the range to the target c is the speed of light, and T is the elapsed time between transmission of the signal and receipt of the signal by the transmitter The fourth step of the method is setting b=1+(2v/c), wherein v is equal to the radial velocity.

The fifth step of the method is setting $f_{\beta,\tau}(t)=s((\beta(t-\tau))$, wherein $\beta$ and $\tau$ are variables.

The sixth step of the method is calculating (b,T)=arg-$\max_{\beta,\tau} |\int s_r^*(t) f_{\beta,\tau}(t) \, dt|$ for the maximum values of b and T.

The seventh step of the method is calculating velocity, v, and range, R, for a target using b and T.

The eighth step of the method is outputting the values of v and R.

In an alternative embodiment, a more accurate estimate of v and R are obtained by normalizing the equations for s(t) and $f_{\beta,\tau}(t)$ to obtain the values for b and T.

BRIEF DESCRIPTION OF THE DRAWINGS

FIG. 1 is a flowchart of the method of the preferred embodiment.

DETAILED DESCRIPTION OF THE INVENTION

The present invention is a method of determining the location and velocity of an object such as a target when operating a radar system, using a modified CAF technique. A flowchart is provided showing the steps of the method. With reference to the flowchart, the first step 1 of the method is sending at least one signal, s(t), at a time, t, from a transmitter to a target. Any appropriate method can be used to send a signal, for example a standard transmitter may send a pulse to a target. The target may be a stationary object or an object in motion. In the preferred embodiment, the transmitter is directing the signal to an object in motion. Many methods are known for sending a signal to a moving object, and any such method can be used in conjunction with the present invention. Further, through the present invention, an object can be located by multiple transmitters or a transmitter in motion by sending several signals to the same object. Modification for application to multiple signals will become apparent with reference to the description below. In the preferred embodiment, multiple signals are sent to the target.

The second step 2 of the method is receiving a return signal from the target at the transmitter. After a signal has been directed at a target, the signal will be reflected off the target and returned to the transmitter. The transmitter then receives the signal. The transmitter, therefore, must have mechanisms to both transmit and receive signals. Many such devices are known in the art, and are commonly used for radar systems. Any such device can be used in conjunction with the present invention. If multiple signals are sent, multiple signals will be received.

The third step 3 of the method is setting R=cT/2, wherein R is the range to the target c is the speed of light, and T is the elapsed time between transmission of the signal and receipt of the signal by the transmitter. Again, if multiple signals are used, each of the ranges will be calculated, R. The elapsed time, T, is a value which will be calculated by the method of the present invention, and which will ultimately allow location of the target. The range is the distance from the transmitter to the target, and will be derived from the elapsed time, T, as will be discussed in greater detail below.

The fourth step 4 of the method is setting b=1+(2v/c), wherein v is equal to the radial velocity of the target with respect to the transmitter and b is a scale factor. If multiple signals are to be used, each radial velocity will be separately calculated as $v_x$. The radial velocity will be calculated according to the method of the present invention, as will become obvious from the description below.

In the present invention, it is recognized that for all signals, s(t) can be modeled as $s(t)=\Sigma a_k e^{ikwt}$. This equation models the signal as a change of scale, and therefore is valid for all signals, as opposed to the CAF process that is valid only for sine Waves. Upon recognition of the correct equation for s(t), it can be found that $s_r(t)=\Sigma a_k e^{ikwb(t-T)}$, wherein s(t) is the transmitted signal, w is the carrier frequency of the signal, t is the time and k is an index value. A simple mathematical calculation can be performed to derive equation $s_r(t)=s(b(t-T))$. This equivalency is necessary for the determination of v and T, as will shown below with reference to the fifth step 5 and sixth step 6 of the method.

The fifth step 5 of the method is setting $f_{\beta,\tau}(t)=s((\beta(t-\tau))$. The symbols β and τ represent variables that are used to find the appropriate values of v and R, as will become obvious with reference to the detailed description below.

The sixth step 6 of the method is calculating (b,T)=argmax$_{\beta,\tau}$|∫S$_r$*(t) f$_{\beta,\tau}$(t) dt| for the maximum values of b and T. As is known in the art, argmax is the "argument of the maximum" operation, which is used to find the maximum value of the argument following the argmax operation. In the given case, the argmax operation is used to estimate b and T. Performance of an argmax operation is well known in the art. To find the maximum values, putative values of β and τ are input into the equation until a maximum value is found for the result of the absolute value of the integral. The values of β and τ maximizing the absolute value of the integral are taken as the estimated values for b and T. As is further known in the art, the symbol * represent the performance of a complex conjugate operation. Performance of such an operation is well known to those of skill in the art.

The problem in computing the scale CAF is that one must compute the value of the surface for several values of scale, β, and delay, τ. We can compute the scale transform for a particular value of β and multiple values of τ using the discrete Fourier transform:

$$S_i[k] = \sum_{n=0}^{N-1} S_i[n] e^{-2\pi i n/N}, k = 1...N$$

where $s_i[n]$ is the i-th sampled signal. This calculation can be accomplished as follows. First, the discrete Fourier transform, <$S_1[k]$>, of an $N_1$ length vector of the first signal, $s_1[n]$ is computed. <$S_1[k]$> is, therefore, a vector of length $N_1$. Next, the discrete Foruier transform, <$S_2[k]$>, of an $N_2$ length vector of the second signal, $s_2[n]$ is computed. <$S_2[k]$> is, therefore, a vector of length $N_2$. Third, the shorter of the computed discrete Fourier transforms resulting from the two operations, <$S_1[k]$> and <$S_2[k]$>, are zero-filled by inserting zeros into the middle of the shorter discrete Fourier transform. The cross-spectrum, <$S_1[k]S_2^*[k]$>, is then formed. Finally, the inverse discrete Fourier transform of the cross-spectrum is computed. The vector resulting from the calculation of the inverse is the scale CAF of the first signal, $s_1[k]$, and the second signal, $s_2[k]$, at scale, β, equal to the ratio of $N_1$ and $N_2$ and multiple delays, τ.

The seventh step 7 of the method is calculating radial velocity, v, and range, R, for a target using b and T. These values can be calculated using the equations provided in the third step 3 and fourth step 4 of the method.

The eighth step 8 of the method is outputting the values of v and R obtained in the seventh step 7 of the method. The values can be output through any conventional means, such as displaying the values to a computer monitor attached to the transmitter.

In an alternative embodiment, a more accurate estimate of v and R are obtained by normalizing the equations for s(t) and $f_{\beta,\tau}(t)$ to obtain the values for b and T. To do this a different method is used to find the maximum values of b and T. In place of the equation provided in the seventh step 7 of the method the following equation is substituted:

$$(b,T) = \text{argmax}_{\beta,\tau} |\int s_r^*(t) f_{\beta,\tau}(t) dt| / \text{sqrt}(|\int s_r^*(t)|^2 \int |f_{\beta,\tau}(t)|^2 dt)$$

As with the equation in the seventh step 7 of the method, the equation is evaluated for the maximum values of β and τ, which are taken as the maximum result for b and T. The eighth step 8 and ninth step 9 of the method are identical with this method as with the method described with respect to the first embodiment.

What is claimed is:

1. A method of determining range and velocity in a radar system comprising the steps of:
   a) sending at least one signal from at least one transmitter to a target, where each at least one transmitter includes a receiver;
   b) receiving at the receiver included in the transmitter that transmitted a signal the signal after it has reflected off of the target, where the signal received by the receiver is correlated to the signal transmitted by the transmitter that includes the receiver;
   c) recording the time elapsed between transmission of each signal and receipt of the return signal, and setting the time elapsed as T for each signal;
   d) calculating the range R from the elapsed time T and radial velocity v of the target using a scale relationship; and
   e) outputting the velocity v and range R of the target.

2. The method of step 1, wherein the step of recording the time elapsed between transmission of each signal and receipt of the return signal, and setting the time elapsed as T for each signal further comprises recording the time elapsed between transmission of each signal, and receipt of the return signal, and setting the time elapsed as T for each signal, wherein R is equal to the range and c is equal to the speed of light and T=2(R/c).

3. The method of claim 2, wherein the step of calculating the range R from the elapsed time T and radial velocity v of the target using a scale relationship further comprises calculating range of the target R from the relation R=cT/2 and using the time scale relationship b=1+(2v/c) to determine the radial velocity v, where c is equal to the speed of light.

4. The method of claim 3, wherein the step of calculating the velocity v and range R of the target using a time scale factor b=1+(2v/c) and the elapsed time T and equal to the speed of light, further comprises the steps of:
   a) setting $s(t)=\Sigma a_k e^{ikwt}$, wherein t is equivalent to time, k is an index, $a_k$ is the Fourier coefficient, i is the imaginary number, and w is equivalent to the carrier frequency;
   b) setting $s_r(t)=B\Sigma a_k e^{ikwb(t-T)}$, wherein B is equivalent to an amplitude factor,
   c) comparing s(t) to $s_r(t)$ to obtain $s_r(t)=Bs(b(t-T))$;
   d) setting $\int s_r^*(t)s_r(t)dt=B\int s_r^*(t)s(b(t-T))dt$, wherein * is the complex conjugate operation;
   e) calculating $(b,T)=\mathrm{argmax}_{\beta,\tau}|\int s_r^*(t)s(\beta(t-\tau))dt|$ for the maximum values of b and T, wherein β is the putative scale factor and τ the putative time delay;
   f) calculating velocity, v, and range, R, for a target using b and T.

5. The method of claim 4, wherein the step of calculating $(b,T)=\mathrm{argmax}_{\beta,\tau}|\int s_r^*(t)s(\beta(t-\tau))dt|$ for the maximum values of b and T, wherein β is the putative scale factor and τ is the putative time delay further comprises the steps of
   a) setting a discrete Fourier transform to $$S_i[k] = \sum_{n=0}^{N-1} S_i[n]e^{-2\pi i n/N}, k = 1\ldots N;$$

b) computing the discrete Fourier transform, $<S_1[k]>$, of an $N_1$ length vector of the first signal, $s_1[n]$;
   c) computing the discrete Fourier transform, $<S_2[k]>$, of an $N_2$ length vector of the second signal, $s_2[n]$
   d) zero-filling the shorter of the computed discrete Fourier transforms resulting from the two operations performed in b) and (c);
   e) setting the cross-spectrum to $<S_1[k]S_2^*[k]>$;
   f) computing the inverse discrete Fourier transform of the cross-spectrum set in (e); and
   g) determining β and τ using the vector resulting from the calculation of the inverse discrete Fourier transform.

6. The method of claim 1, wherein the step of calculating the range R from the elapsed time T and radial velocity v of the target using a scale relationship further comprises calculating the range R from the elapsed time T and radial velocity v of the target using a scale relationship wherein b is equal to the time scale factor, v is equal to the radial velocity, c is equal to the speed of light, and the time scale relationship is equivalent to b=1+(2v/c).

7. A method of determining range and velocity in a radar system comprising the steps of
   a) sending a signal from a plurality of transmitters to a target, where each of the plurality of transmitters includes a receiver,
   b) receiving at the receiver included in the transmitter that transmitted a signal the signal after it has reflected off of the target, where the signal received by the receiver is correlated to the signal transmitted by the transmitter that includes the receiver;
   c) recording the time elapsed between transmission of each signal and receipt of the return signal, and setting the time elapsed as T for each signal;
   d) calculating the velocity and range of the target using a scale relationship calculated from the elapsed; and
   e) outputting the velocity and range of the target.

8. The method of step 7, wherein the step of recording the time elapsed time between transmission of each signal and receipt of the return signal, and setting the time elapsed as T for each signal further comprises recording the time elapsed between transmission of each signal and receipt of the return signal, and setting the time elapsed as T for each signal, wherein R is equal to the range and c is equal to the speed of light and T=2(R/c).

9. The method of claim 8, wherein the step of calculating the velocity and range of the target using a scale relationship and the elapsed time further comprises calculating the velocity and range of the target using a scale relationship and the elapsed time wherein b is equal to the time scale factor, v is equal to the radial velocity, c is equal to the speed of light, and the time scale relationship is equivalent to b=1+(2v/c).

10. The method of claim 9, wherein the step of calculating the velocity and range of the target using a scale relationship and the elapsed time wherein b is equal to the time scale factor, v is equal to the radial velocity, cis equal to the speed of light, and the time scale relationship is equivalent to 1+(2v/c) further comprises the steps of
    a) setting $s(t)=\Sigma a_k e^{ikwt}$, wherein t is equivalent to time, k is an index, $a_k$ is the Fourier coefficient, i is the imaginary number, and w is equivalent to the carrier frequency;
    b) setting $s_r(t)=B\Sigma a_k e^{ikwb(t-T)}$, wherein B is equivalent to an amplitude factor;
    c) comparing s(t) to $s_r(t)$ to obtain $s_r(t)=Bs(b(t-T))$;
    d) setting $\int s_r^*(t)s_r(t)dt=B\int s_r^*(t)s(b(t-T))dt$, wherein * is the complex conjugate operation;
    e) calculating $(b,T)=\mathrm{argmax}_{\beta,\tau}|\int s_r^*(t)s(\beta(t-\tau))dt|$ for the maximum values of b and T, wherein β is the putative scale factor and τ is the putative time delay;
    f) calculating velocity, v, and range, R, for a target using b and T.

11. The method of claim 7, wherein the step of calculating the velocity and range of the target using a scale relationship and the elapsed time further comprises calculating the velocity and range of the target using a scale relationship and the elapsed time wherein b is equal to the time scale factor, v is equal to the radial velocity, c is equal to the speed of light, and the time scale relationship is equivalent to b=1+(2v/c).

* * * * *